INVENTOR.
Ralph R. Randall
BY

United States Patent Office

2,773,723
Patented Dec. 11, 1956

2,773,723

BRAKING ARRANGEMENT FOR DUAL WHEELS WITH NON-TORQUE-EQUALIZING DIFFERENTIAL MEANS

Ralph R. Randall, Freeport, Ill., assignor, by mesne assignments, to Dualoc Engineering Co., Rockford, Ill., a corporation of Illinois Continuation of abandoned application Serial No. 48,217, September 8, 1948. This application July 31, 1953, Serial No. 371,582

1 Claim. (Cl. 301—6)

My invention relates to non-torque-equalizing differential transmissions.

This application is a continuation of my copending application Serial No. 48,217, filed September 8, 1948, and since abandoned.

One of the objects of my invention is to provide an improved non-torque-equalizing differential involving the use of planetary nut gears and internal gears coaxial with the road-engaging wheels.

Another object of my invention is to provide an improved non-torque-equalizing differential transmission having a braking arrangement which will effect a braking action on both the wheels of a dual wheel assembly during differential rotation thereof only.

A further object of my invention is to provide a non-torque-equalizing differential transmission using simple spur gear transmission elements and simple screw-threaded constructions for the locking action which will be satisfactory for use in dual wheel constructions, such as on trailers and trucks.

A further object is to provide in a torque-distributing differential of the general construction shown in Figs. 5 and 6 of applicant's Patent No. 2,536,392 having a torque distributing means including internally threaded gear means and gear means having a threaded shaft threaded into said internally threaded gear means, a nonrotatable central stub axle, a gear carrier rotatably mounted thereon, and brake means for controlling the rotation of said gear carrier. It is obvious that adidtional braking means are normally relied on to assure positive braking of the vehicle.

Further objects and advantages of the invention will be apparent from the description and claim.

In the drawings in which an embodiment of my invention is shown,

Figure 1:
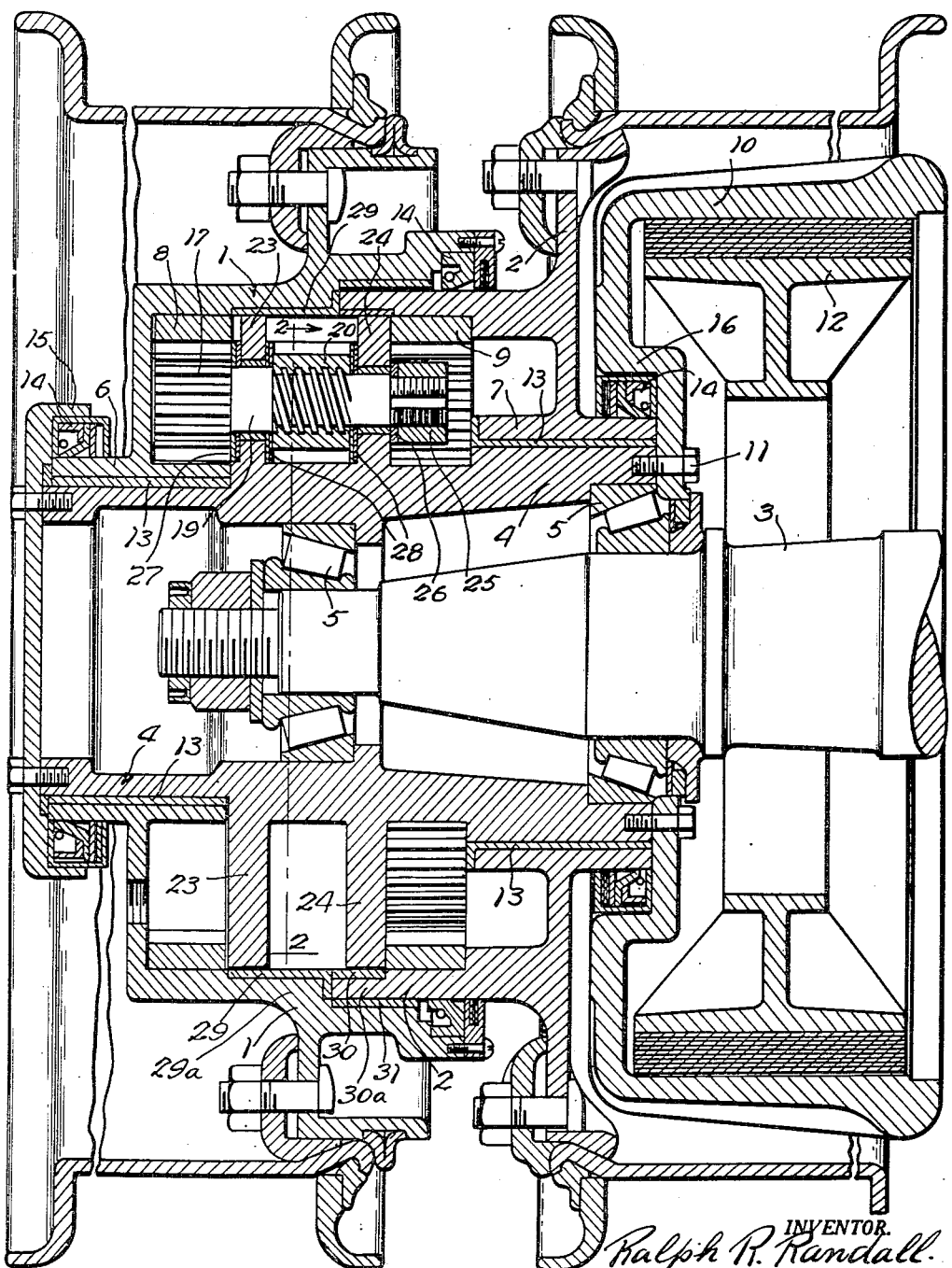
Fig. 1 is an axial sectional view of a dual wheel construction embodying my invention.
Figure 2:
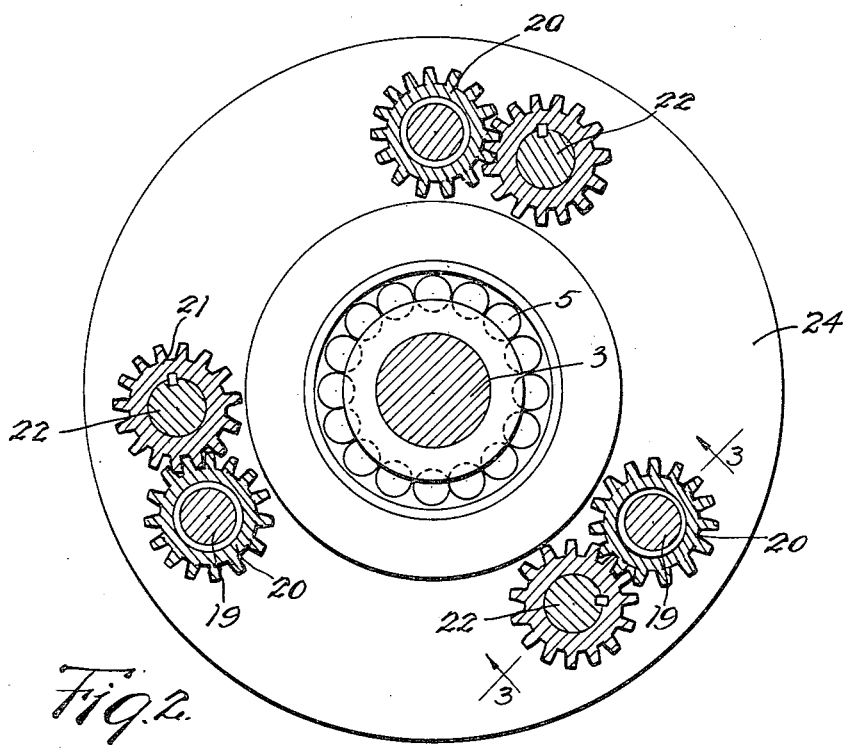
Fig. 2 is a section substantially on the line 2—2 of Fig. 1.
Figure 3:
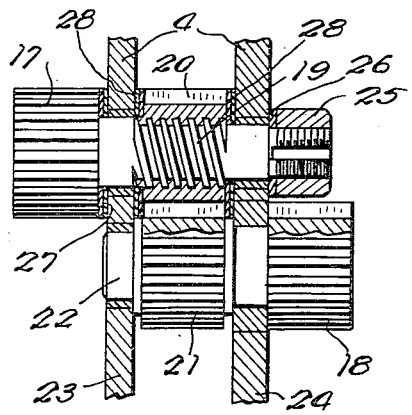
Fig. 3 is a section substantially on the line 3—3 of Fig. 2.

The construction shown may be for use with a dual wheel drive in which a pair of road-engaging wheels 1 and 2 are mounted on a bearing stud 3 extending laterally from the side of the vehicle. This bearing stud may carry either a pair of steerable wheels or a pair of non-steerable wheels. In either case, the wheels may be used either as nondrive wheels or as drive wheels and in both cases will be provided with a differential gearing between the two road-engaging wheels.

The construction shown comprises the bearing stud or stub axle 3, the gear carrier 4 rotatably mounted thereon by means of anti-friction bearings 5, the flanged hubs 6 and 7 of the dual wheel elements 1 and 2, differential gearing acting between the gear carrier and the two internal spur gears 8 and 9 rotatable in the wheel elements 1 and 2, and an internal brake drum 10 secured to the gear carrier 4 by means of cap screws 11 and controlled by an internal expanding brake 12. Suitable bearing bushings 13 may be provided between the gear carrier 4 and the hubs 6 and 7 of the wheels. Suitable oil seals 14 may be provided, one between the cylindrical housings of the wheel elements 1 and 2, another between the hub 6 and the flanged retaining collar 15 secured to the gear carrier 4 and another between the hub 7 and a flange 16 on the brake drum 10.

The non-equalizing-torque transmission between the gear carrier 4 and the two wheels 1 and 2 comprises the two internal spur gears 8 and 9 coaxial with the rotatable gear carrier 4 and mounted on the wheels 1 and 2, respectively, a plurality of pairs of spur gears, one gear 17 of each pair meshing with the internal gear 8 and the other gear 18 of each of said pairs meshing with the other internal gear 9, a plurality of externally threaded shafts 19 rotatable, respectively, with the spur gears 17, a plurality of internally threaded spur gears 20, one threaded on each shaft 19, a plurality of spur gears 21 splined on the shafts 22 and meshing, respectively, with said internally threaded spur gears 20 and rotatable, respectively, with the gears 18, also splined on the shafts 22, and means for limiting the threading movement of said threaded gears 20 on said threaded shafts 19 to lock the threaded gears and threaded shaft to the gear carrier 4.

The gear carrier 4 comprises a hub member having two outwardly-extending flanges 23 and 24. The shafts 19 and 22 are rotatably mounted in bearing openings in these flanges.

Each of the screw-threaded shafts 19 with which the spur gear 17 is rotatable is held against axial movement in the flanges 23 and 24 by means of a nut 25, screwed on the threaded shaft 19 which holds a bearing collar 26 in engagement with the flange 24 and an annular side shoulder on the spur gear 17 which bears against a bearing collar 27 engageable with the other flange 23. One side face of the internally threaded gear 20 may bear against the inner face of the flange 23, and the other side face of this gear may bear against the inner face of the other flange 24. Suitable bearing collars 28 may be provided for the engaging faces. Either of these engagements will cause the spur gear 20 to be clamped against relative rotation with respect to the gear carrier 4.

In order to insure alignment and elimination of friction a bearing sleeve 29 is provided between the flange 23 and the cylindrical housing 29ª of the wheel member 1, another bearing sleeve 30 between the flange 24 and the cylindrical housing 30ª of the wheel 2, and another bearing sleeve 31 between the wheel members 1 and 2. This construction maintains the parts in axial alignment, reduces friction and prevents chatter.

In use, if one ground engaging wheel has traction and the other does not and power is being applied to control the rotation of the gear carrier 4, the internally threaded gears 20 will rotate slightly, due to the road resistance of the ground wheel which has traction until each of these internally threaded gears 20 has rotated sufficiently to cause it to press against and frictionally engage one or the other of the flanges 23 or 24. In this action the shaft 19 is held against endwise movement by the collar 26 and the shouldered gear 17. If desired, the pitch of the threads on the shaft 19 may be such as to lock the internally threaded gear 20, the gears 21, 18 and 9, the threaded shaft 19 and the gears 17 and 8 against further rotation with respect to the gear carrier 4. Further driving or braking force applied to the gear carrier 4 will be transmitted directly to the ring gear 8 or 9 of that wheel which has traction through one or the other of the locked spur gears 17 or 18, regardless of the fact that one of the ground-engaging wheels has no tractive effect.

If the vehicle is going around a corner and one or other of the ground-engaging wheels has to precess, the driving or braking effort will be transmitted equally to the lagging wheel and to the precessing wheel which adjust themselves because of their engagement with the ground.

Further modifications will be apparent to those skilled in the art and it is desired, therefore, that the invention be limited only by the scope of the appended claim.

Having thus described my invention, what I claim and desire to secure by Letters Patent is:

A dual wheel differential gear construction comprising an axle, a tubular gear carrier rotatably mounted on said axle, brake means carried by said gear carrier for controlling the rotation of said gear carrier, an annular bearing bushing mounted on the outer surface of said gear carrier at each end thereof, said gear carrier having a pair of annular spaced flanges centrally located on the outside surface thereof, a pair of wheel elements each having a flanged hub and a cylindrical housing, said annular bearing bushings supporting said flanged hubs, one of said cylindrical housings encircling one of said spaced flanges and the other of said cylindrical housings encircling the other of said spaced flanges, bearing sleeve means mounted on the periphery of said flanges and supporting said cylindrical housings, one of said cylindrical housings projecting beyond its respective encircled flange and encircling the other of said spaced flanges and projecting over and encircling the end of the other of said cylindrical housings, a bearing sleeve mounted on the end of the other of said cylindrical housings and supporting the projection of the said one of said cylindrical housings, a non-torque equalizing transmission acting between said gear carrier and said wheel elements and carried by said annular spaced flanges, said transmission comprising a pair of internal spur gear elements rotatable with said wheel elements, a second pair of spur gear elements meshing with said first pair of gear elements, an externally screw-threaded shaft rotatable with one of said second pair of spur gear elements, an internally-threaded spur gear element having a threading movement on said shaft, a spur gear element meshing with said internally-threaded spur gear element and rotatable with the other one of said second pair of spur gear elements, and means including said flanges for limiting the threading movement of said internally-threaded gear element on said threaded shaft whereby to bind said threaded gear element and said threaded shaft to said gear carrier comprising a bearing element between the threaded gear element and the flanges engaged by said threaded gear element in its threaded movement in either direction.

References Cited in the file of this patent
UNITED STATES PATENTS

| | | |
|---|---|---|
| 2,251,538 | Ash | Aug. 5, 1941 |
| 2,462,000 | Randall | Feb. 15, 1949 |
| 2,536,119 | Ash | Jan. 2, 1951 |
| 2,536,392 | Randall | Jan. 2, 1951 |